(12) United States Patent
Billington et al.

(10) Patent No.: US 6,963,487 B2
(45) Date of Patent: Nov. 8, 2005

(54) PEDESTAL COMPUTER DOCKING STATION

(75) Inventors: Corey A. Billington, San Jose, CA (US); Chris Bradley, Redwood City, CA (US); Raymond Moskaluk, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 10/012,800

(22) Filed: Oct. 25, 2001

(65) Prior Publication Data
US 2004/0017652 A1 Jan. 29, 2004

(51) Int. Cl.⁷ .................................................. G06F 1/16
(52) U.S. Cl. ...................... 361/686; 361/683; 248/918; 248/924
(58) Field of Search ................................ 361/680–683, 361/686; 312/223.1, 223.2; D14/107, 356, D14/357, 434, 447, 432, 451, 452; 248/918, 248/924

(56) References Cited

U.S. PATENT DOCUMENTS

| | | | |
|---|---|---|---|
| D253,775 S * | 12/1979 | Lar Rieu ...................... D19/91 |
| 5,268,817 A * | 12/1993 | Miyagawa et al. ......... 361/681 |
| 5,396,400 A | 3/1995 | Register et al. |
| 5,436,792 A | 7/1995 | Leman et al. |
| 5,600,580 A | 2/1997 | Honjo et al. |
| 5,796,576 A | 8/1998 | Kim |
| 5,805,415 A | 9/1998 | Tran et al. |
| 5,815,735 A | 9/1998 | Baker |
| 5,822,185 A | 10/1998 | Cavello |
| 5,899,421 A * | 5/1999 | Silverman .................... 248/175 |
| 5,936,619 A * | 8/1999 | Nagasaki et al. ........... 345/205 |
| 6,005,767 A | 12/1999 | Ku et al. |
| 6,076,786 A | 6/2000 | Meyer |
| 6,185,096 B1 | 2/2001 | Helot et al. |
| 6,189,850 B1 | 2/2001 | Liao et al. |
| 6,208,508 B1 | 3/2001 | Ruch et al. |
| 6,233,138 B1 | 5/2001 | Osgood |
| 6,243,727 B1 | 6/2001 | Watts, Jr. |
| 6,256,193 B1 | 7/2001 | Janik |
| 6,266,235 B1 | 7/2001 | Leman |
| 6,597,384 B1 * | 7/2003 | Harrison ...................... 345/169 |
| 6,633,482 B2 * | 10/2003 | Rode ........................... 361/686 |

* cited by examiner

Primary Examiner—Lynn Feild
Assistant Examiner—Anthony Q. Edwards

(57) ABSTRACT

The present invention provides a pedestal docking station including an upwardly extending pedestal having an upper end, a base section, and a center of mass; an upper mounting member coupled to the upper end of the upwardly extending pedestal to receive the notebook computer in an elevated, supporting relationship at least four inches above a work surface with a center of mass of the notebook computer in substantial vertical alignment with the center of mass of the upwardly extending pedestal; and port replicator components coupled to the upper mounting member, the port replicator components corresponding to input/output ports of the notebook computer and including connections for attachment to supporting peripheral components.

6 Claims, 8 Drawing Sheets

PEDESTAL COMPUTER DOCKING STATION

BACKGROUND OF THE INVENTION

1. Field of the Invention

The present invention relates generally to pedestal docking station with a small footprint that can be used to convert a notebook computer to a desktop computer configuration.

2. Related Art

Advances in computer technology have led to the increasing popularity of notebook, or laptop, computers. No longer constrained to desktop computer workstations, many people now perform a large percentage of their work on notebook computers while away from the desk. Of course, much work is still performed while at the desk, and many people must choose between using a desktop computer while in the office and a notebook while away, or using a notebook computer exclusively, even while working at the desk. Both options present disadvantages. Owning and operating two computers involves additional expense, as two systems must be purchased and maintained. A high level of inconvenience is also introduced in that the two systems must be synchronized, that is, any work performed on one must be transferred to the other.

In contrast, by using only a notebook computer, a user can gain the advantage of a portable computer without incurring the added expense and inconvenience associated with owning two systems. Such a solution, however, comes at a cost. Notebook computers were designed to be compact and portable. As a result, the design of notebook peripheral components, such as the keyboard and mouse, have moved away from the more ergonomic designs associated with desktops to the less comfortable but more compact designs for notebooks. Using a notebook for extended periods of time can be uncomfortable for the user and can lead to repetitive stress injuries.

But perhaps the most undesirable aspect of using a notebook as a desktop is the notebook display. Because the notebook display is traditionally an integral part of the notebook, the display cannot be moved independently of the notebook The display is always in the same position relative to the keyboard and pointing device, regardless of the personal preferences or physical needs of the user. Also, the display traditionally rests, with the notebook, on the work surface, and can only be elevated by placing the notebook on an elevating structure, also elevating the keyboard and pointing device to an unnatural height. Consequently, using a notebook for extended periods of time as a desktop computer is not a comfortable alternative.

In an effort to address these problems, notebook docking stations have been developed. In a typical docking station scenario, the notebook is docked into a station that is already connected to peripheral devices, such as an external display screen, desktop keyboard and mouse. The hard drive and processor of the notebook are used in connection with these more comfortable desktop peripheral components. Docking stations traditionally fall into two categories, those which utilize a desktop monitor for the visual display and those which utilize the notebook display. Utilizing a desktop monitor provides a larger viewing area, but necessarily means that the docking station has a large footprint, that is it consumes a large portion of the available work surface. It also, of course, involves the additional expense of purchasing both a docking station and a desktop monitor.

In an effort to solve these problems, docking stations have been developed that utilize the display screen of the notebook computer. An example of such a docking station can be found in U.S. Pat. No. 6,185,096, Helot, et al., owned by the assignee of the present invention. These types of docking stations typically have a foundation that provides connections to the peripheral components and also serves as a base for the mechanism which elevates the notebook computer. The elevation of the notebook computer can be adjusted as well as the angle of the notebook display. While these types of docking stations provide more flexibility by using the display of the notebook, they still consume a large footprint due to the necessity of supporting the notebook. As the notebook is adjusted, the base must be large and heavy enough to offset the mass of the notebook to prevent the docking station from falling over. The resulting device is a docking station that allows the use of the notebook display but which still consumes a large footprint.

SUMMARY OF THE INVENTION

It has been recognized that it would be advantageous to develop a docking station with a small footprint to convert a notebook computer to a desktop configuration that provides vertical elevation of the notebook display while maintaining substantially vertical alignment of the centers of mass of the docking station and the notebook computer.

The present invention provides a pedestal docking station including an upwardly extending pedestal having an upper end, a base section, and a center of mass; an upper mounting member coupled to the upper end of the upwardly extending pedestal to receive the notebook computer in an elevated, supporting relationship at least four inches above a work surface with a center of mass of the notebook computer in substantial vertical alignment with the center of mass of the upwardly extending pedestal; and port replicator components coupled to the upper mounting member, the port replicator components corresponding to input/output ports of the notebook computer and including connections for attachment to supporting peripheral components.

In accordance with another, more detailed aspect of the present invention, the pedestal docking station includes a securing device coupled to either the upper mounting member of the pedestal or to the upwardly extending pedestal in order to hold the notebook computer in a stable, substantially vertically inclined position.

In accordance with another, more detailed aspect of the present invention, the pedestal docking station includes a wireless data transmitting and receiving unit coupled to the upwardly extending pedestal and interconnected to the port replicator components by data links for use with wireless peripheral components.

In accordance with another, more detailed aspect of the present invention, the pedestal docking station includes a notebook computer having a plurality of sides and includes input/output ports located on at least one side of the notebook computer, the input/out ports being configured to be received by the port replicator components; orientation circuitry coupled to the input/output ports to identify which of the input/output ports are being received by the port replicator components; and display rotation circuitry coupled to the input/output ports to rotate visual images displayed on the display screen of the notebook computer.

In accordance with another, more detailed aspect of the present invention, the pedestal docking station includes a folding support member rotatably coupled to the base section of the pedestal and at least one locking device coupled to the base section to selectively lock the position of the at least one folding support member relative to the base section.

In accordance with another, more detailed aspect of the present invention, the pedestal docking station includes an upper mounting member rotatably coupled to the upwardly extending pedestal and at least one locking device coupled to the upwardly extending pedestal to selectively lock the position of the at least one support member relative to the pedestal.

In accordance with another, more detailed aspect of the present invention, the upper mounting member of the pedestal docking station is selectively and rotatably coupled to the upwardly extending pedestal to enable the operator to adjust a viewing angle of the display screen of the notebook computer or to rotate the display screen into a portrait or landscape orientation.

In accordance with another, more detailed aspect of the present invention, the display screen of the notebook computer is rotatably coupled to a processing unit of the notebook computer to selectively rotate at least 180° about a vertical axis with respect to the processing unit and collapse onto the processing unit in a closed configuration, forming a flat screen monitor configuration with the display screen exposed for viewing.

In accordance with another, more detailed aspect of the present invention, the input/output ports of the notebook computer are located on a bottom surface of the notebook computer to align with the port replicator components on the mounting member when the display unit is rotated 180° and collapsed onto the processing unit in a flat monitor configuration.

In accordance with another, more detailed aspect of the present invention, the mass of the base section of the upwardly extending pedestal is substantially greater than the mass of the upper end of the pedestal to stabilize the docking station in a standing configuration capable of supporting the mass of the notebook computer.

In accordance with another, more detailed aspect of the present invention, the base section of the upwardly extending pedestal has a widest portion adjacent to the work surface to maximize an area of the work surface in direct physical support of the docking station.

In accordance with another, more detailed aspect of the present invention, the pedestal docking station further includes a lower support base coupled to and extending outwardly from the base section of the upwardly extending pedestal to provide additional stability to the docking station.

In accordance with another, more detailed aspect of the present invention, the upwardly extending pedestal tapers from the base section to the upper end.

In accordance with another, more detailed aspect of the present invention, the docking station further includes a spooling device coupled to the upwardly extending pedestal; a retracting device coupled to the spooling device and the upwardly extending pedestal; a power supply cord coupled to the spooling device to supply power to the pedestal docking station; and a retraction activation device, coupled to the upwardly extending pedestal and operatively coupled to the retracting device to selectively activate the retracting device to retract the power cord onto the spooling device.

In accordance with another, more detailed aspect of the present invention, the docking station further includes a visual indicator device coupled to the upwardly extending pedestal and connection detection circuitry coupled to the visual indicator device and the port replicator components to detect whether the notebook is properly docked to the pedestal docking station and activate the visual indicator device accordingly.

In accordance with another, more detailed aspect of the present invention, the docking station further includes an upper section and a lower section slidably coupled to each other; a locking device coupled to the upper and lower sections to lock the position of the upper and lower sections relative to each other; and a release mechanism coupled to the locking device to selectively engage and disengage the locking device to adjust a height of the upwardly extending pedestal.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIGS. 8b and 8c are perspective views of alternate embodiments of the present invention utilizing the notebook computer of FIG. 8a.

DETAILED DESCRIPTION

Figure 1:
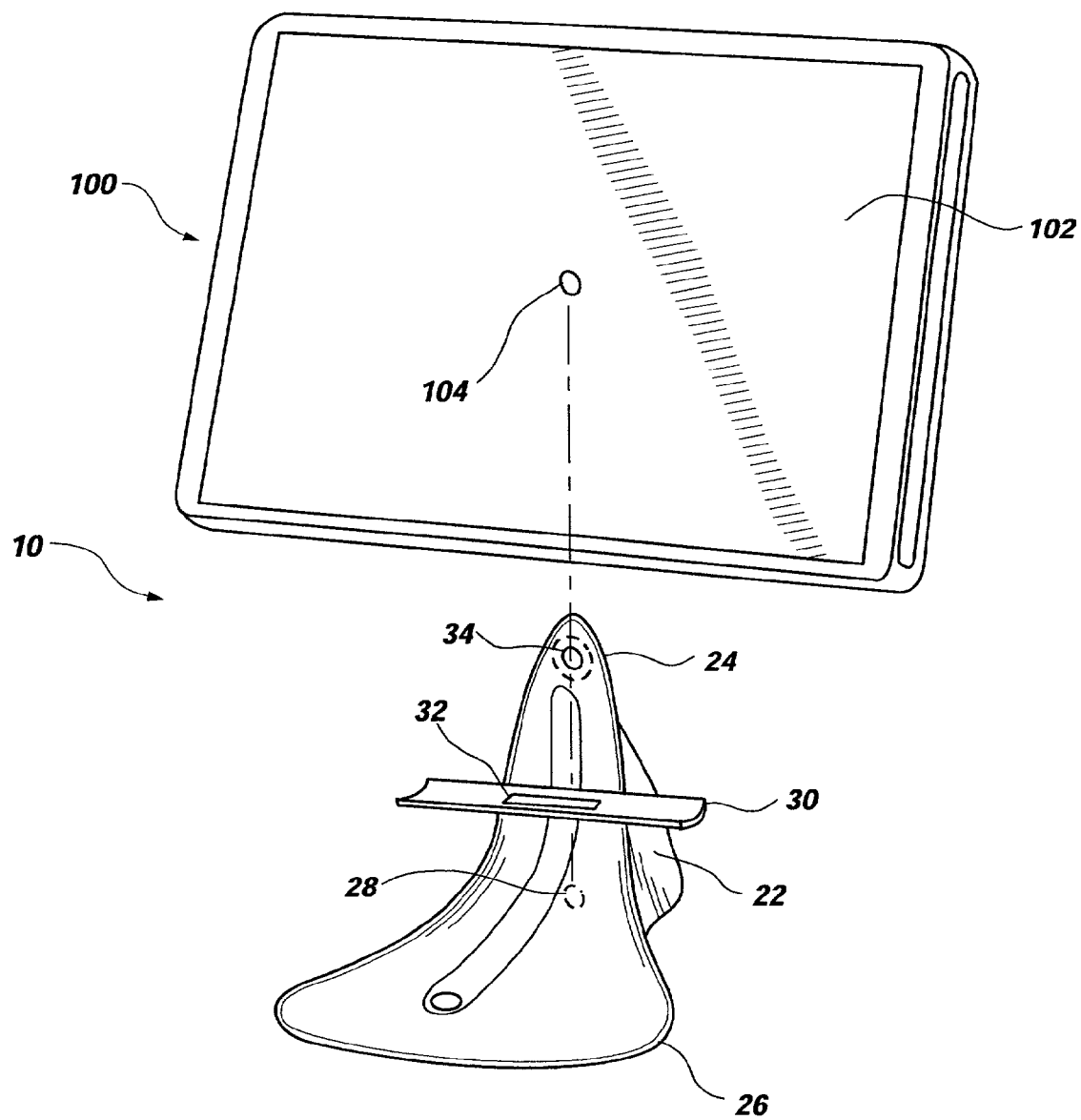
FIG. 1 is an elevated, perspective view of a preferred embodiment of a pedestal docking station in accordance with the present invention.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 2:
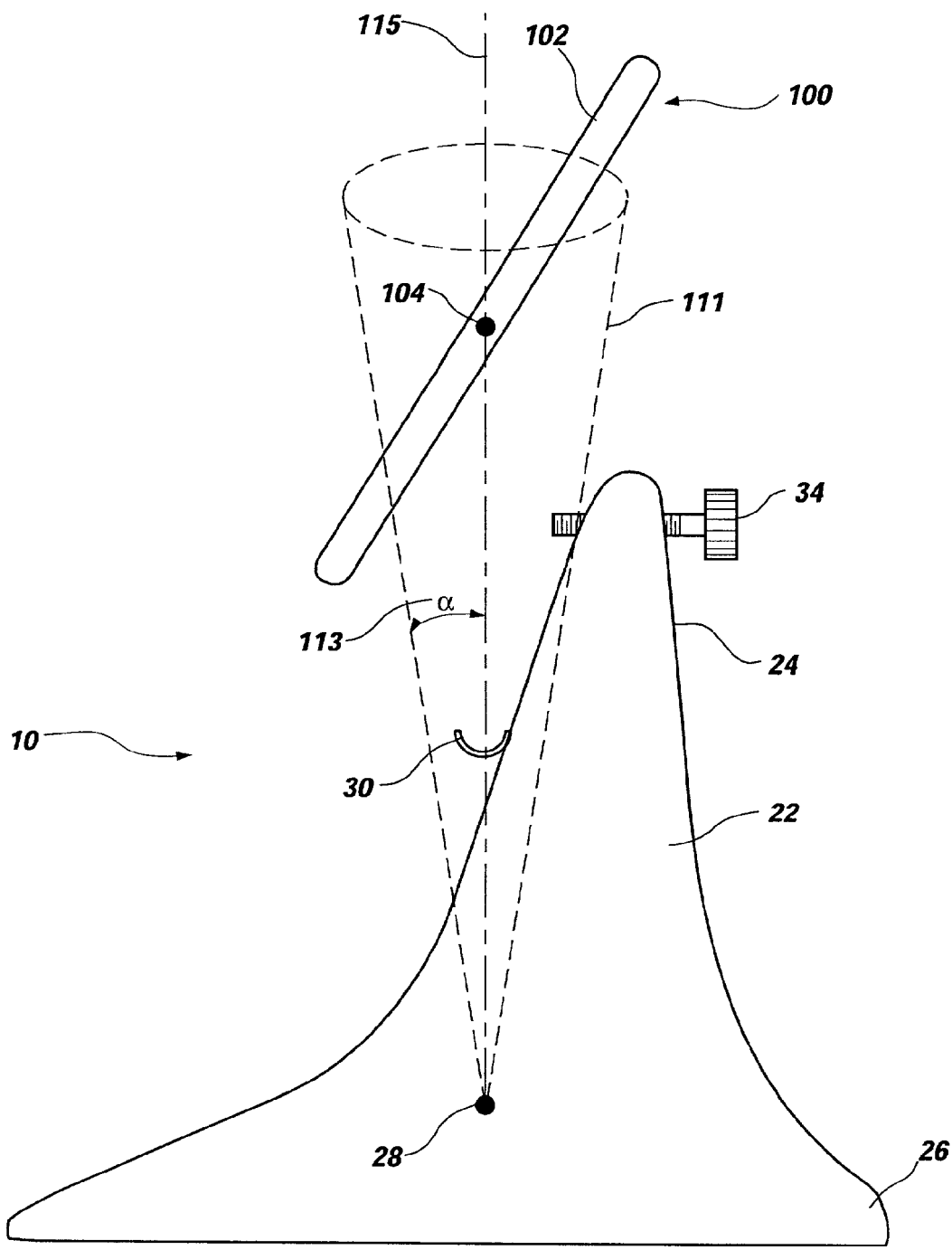
FIG. 2 is a perspective side view of the pedestal docking station of FIG. 1.

As illustrated in FIGS. 1 and 2, a system, indicated generally at 10, in accordance with the present invention is shown for a pedestal docking station. The pedestal docking station can be used to convert a notebook computer 100 to a desktop computer configuration which utilizes the display screen 102 of the notebook computer. Specifically, a user can dock the notebook into the pedestal docking station and utilize the display and processing unit of the notebook while utilizing desktop peripheral components such as a keyboard or pointing device. The pedestal docking station can be used with any portable computing device, such as a palm-held device or a tablet device. In the interest of clarity, the present discussion will focus on the use of the pedestal docking station with a notebook computer, while it is to be understood that the present invention is not limited to only notebook computers. It should be understood that reference to notebook computers herein shall include other portable computing devices such as tablets, PDAs or laptops.

In accordance with one aspect of the present invention, the pedestal docking station 10 provides an upwardly extending pedestal 22 having and an upper end 24, a base section 26, and a center of mass indicated at a hypothetical location 28 contained within the surface configuration of the pedestal 22, as shown in FIGS. 1 and 2. Due to the structural configuration of pedestal 22, the center of mass is invariable, meaning that the pedestal comprises a single center of mass located at a stationary location, shown as location 28. An upper mounting member 30 provides support for the notebook computer 100. Included within the upper mounting member are port replicator components 32 which correspond with input/output ports (not shown) of the notebook computer. A securing device 34 can be coupled to the upwardly extending pedestal to secure the notebook in a stable position. The securing device can be a threaded rod which screws into a corresponding receptor (not shown) in the notebook computer, or another type as would occur to one skilled in the art. The securing device can also be located elsewhere on the upwardly extending pedestal or as an integral part of the upper mounting member 30.

It will be appreciated that the centers of mass of the notebook and docking station, 104 and 28, respectively, are in substantially vertical alignment when the notebook is docked with the pedestal docking station. As used herein, "substantially vertical alignment" occurs when the center of mass of the notebook computer falls within a 20° cone defined by an apex located at the center of mass of the pedestal docking station 28 and an upwardly and outwardly extending lateral surface 111 diverging at a +/−20° angle 113 from true vertical 15, as illustrated in FIG. 2. The present invention thus provides a stable docking environment for the notebook while maintaining a small footprint, that is, without consuming a large surface area. By using a pedestal configuration, the present invention allows vertical elevation of the notebook display while departing from the prior art, which required a large footprint to adequately support the notebook.

Figure 3A:
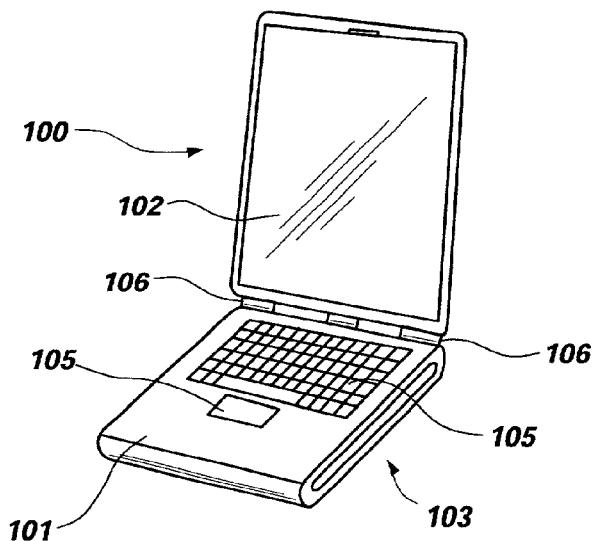
FIGS. 3a through 3c are elevated, perspective views of an alternate embodiment of a notebook computer for use with the pedestal docking station.
Figure 3B:
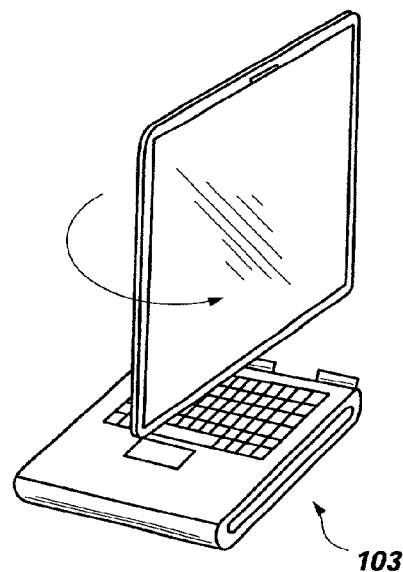
Figure 3C:
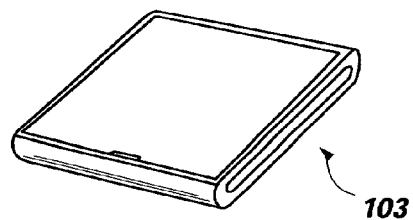

As illustrated in FIGS. 3a through 3c, the notebook computer 100 can have a display screen 102 that can rotate and hinge with respect to a processing unit 101. FIGS. 3a through 3c show a series of movements as the display screen is swiveled 180° relative to the processing unit and folded over the top of the processing unit with the display screen in a viewing configuration. By providing a notebook with a rotatable display screen, the present invention can form a flat monitor configuration, advantageously maintaining the initial orientation of the processor 101. It will be appreciated that none of the initially exposed delicate controls 105 are exposed when the notebook is in the flat panel display configuration. When the notebook is in the flat panel configuration and docked with the pedestal docking station, the centers of mass of the notebook and the docking station are in substantially vertical alignment, providing a compact yet stable desktop configuration.

Figure 4:
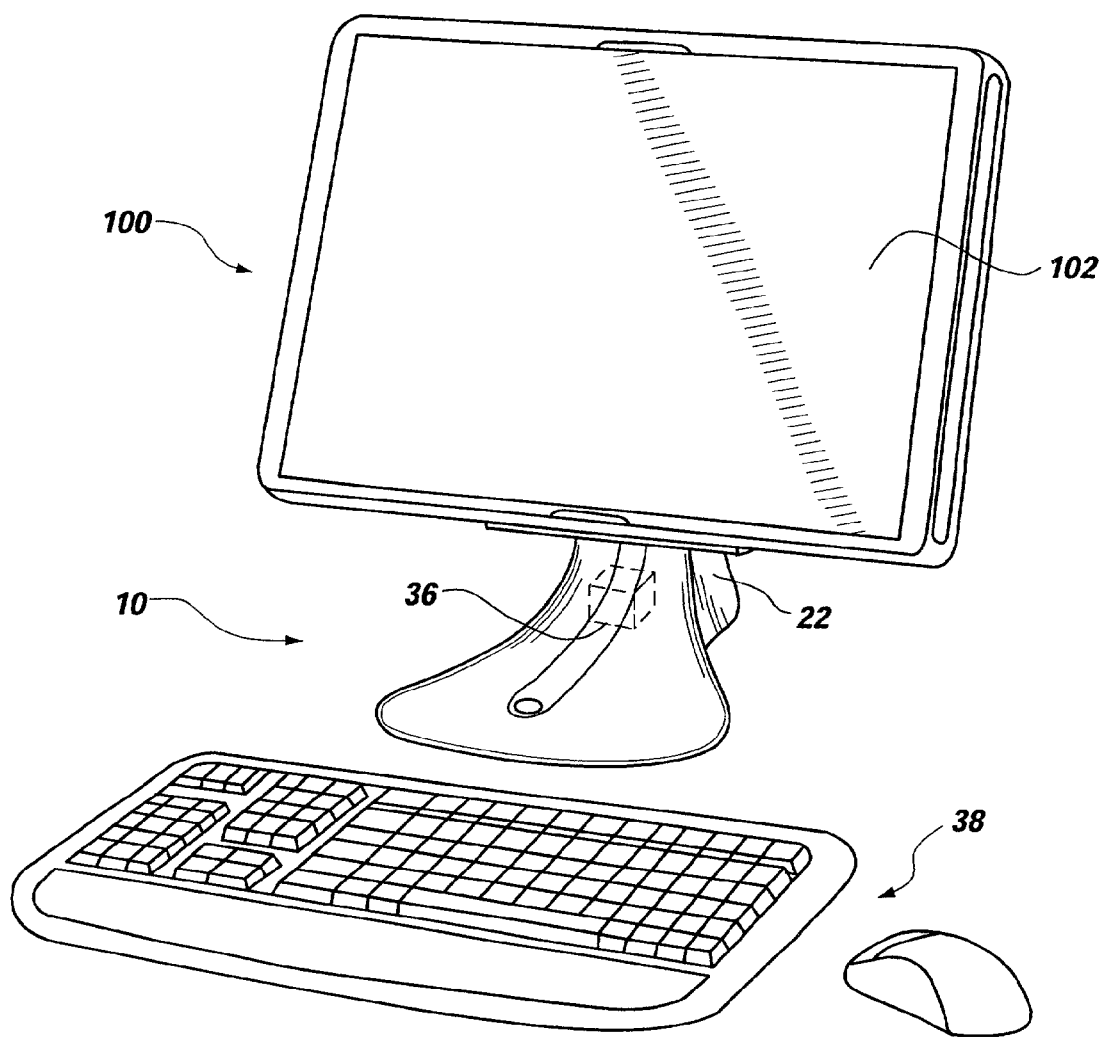
FIG. 4 is an elevated, perspective view of an alternate embodiment of the present invention.

FIG. 4 illustrates how the present invention appears when in the flat monitor display configuration and docked to the docking station. In this embodiment, a wireless data transmitting and receiving device 36 can be coupled inside the upwardly extending pedestal to enable use with wireless peripheral components 38. In practice, the wireless data transmitting and receiving device could be located anywhere on or in the pedestal docking station. Alternately, traditional peripheral components (not shown) may be used, with hardwired connections to the docking station.

Figure 5:
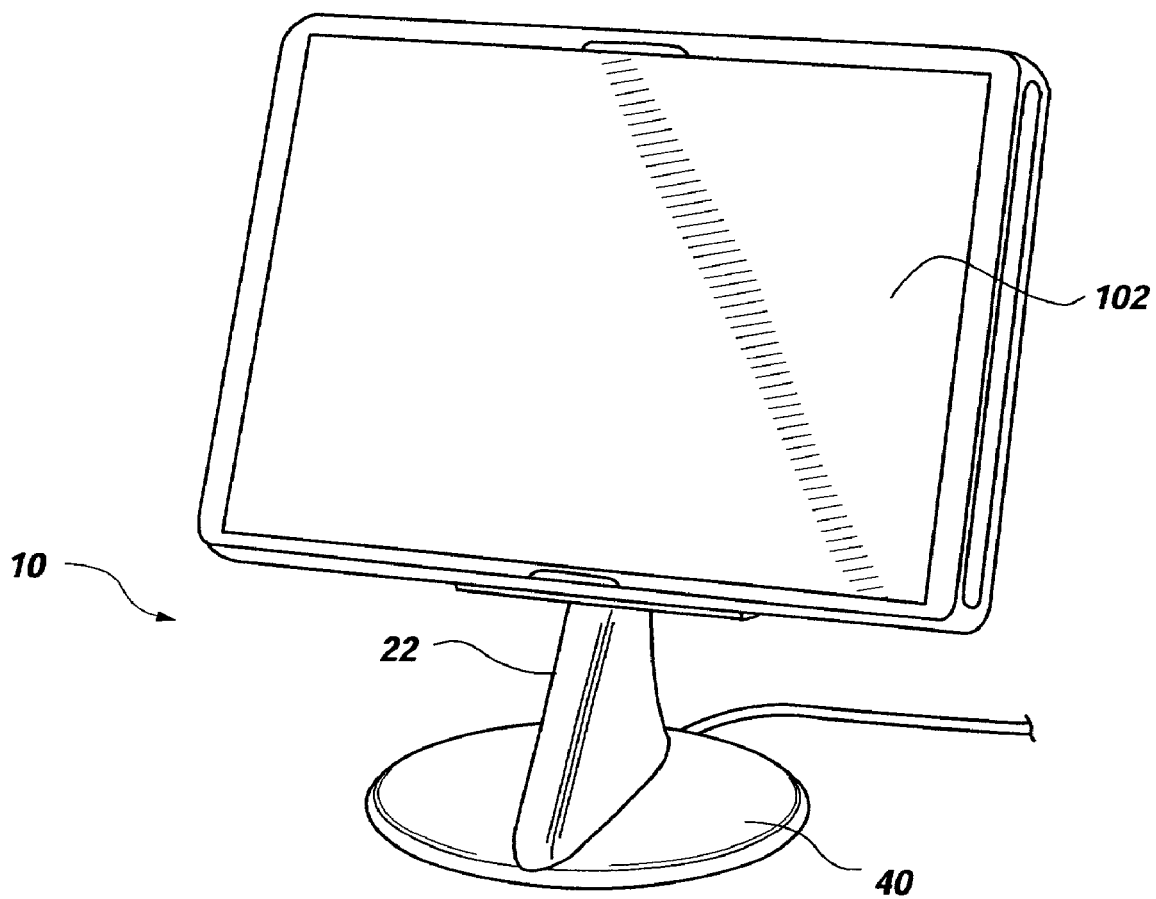
FIG. 5 is an elevated, perspective view of an alternate embodiment of the present invention.

FIG. 5 illustrates an alternate embodiment of the present invention in which the upwardly extending pedestal 22 is coupled to a lower support base 40 which adds additional support to the pedestal station. Adding the lower support base does not disturb the substantially vertical alignment of the centers of mass of the notebook and the docking station; however, by increasing the width of the support base, the vertical alignment of the center of mass of the computer can deviate further from the center of mass of the pedestal docking station. Consequently, a stable docking station is provided which minimizes the space required while maintaining vertical elevation of the display screen 102.

Figure 6B:
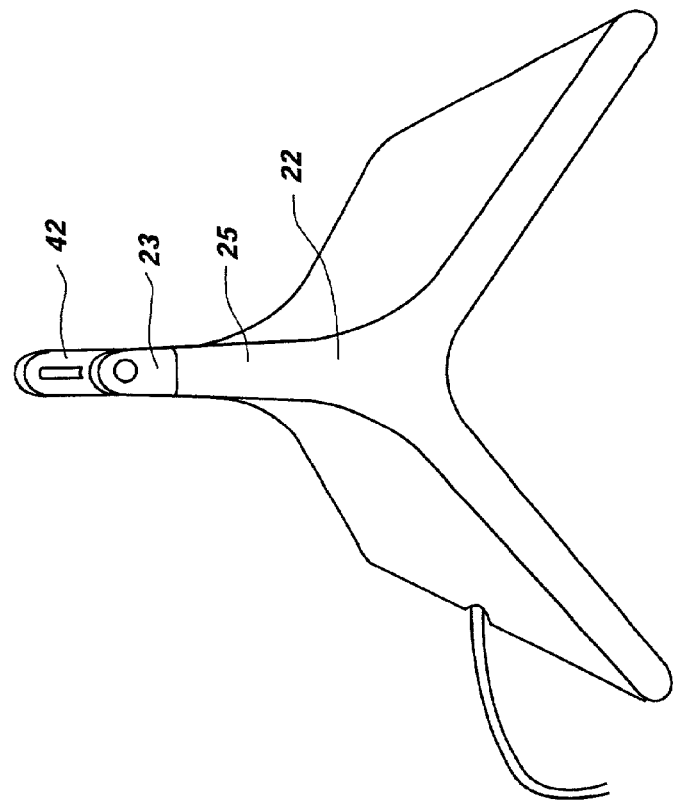
FIGS. 6a and 6b are elevated, perspective views of an alternate embodiment of the present invention.
Figure 6A:
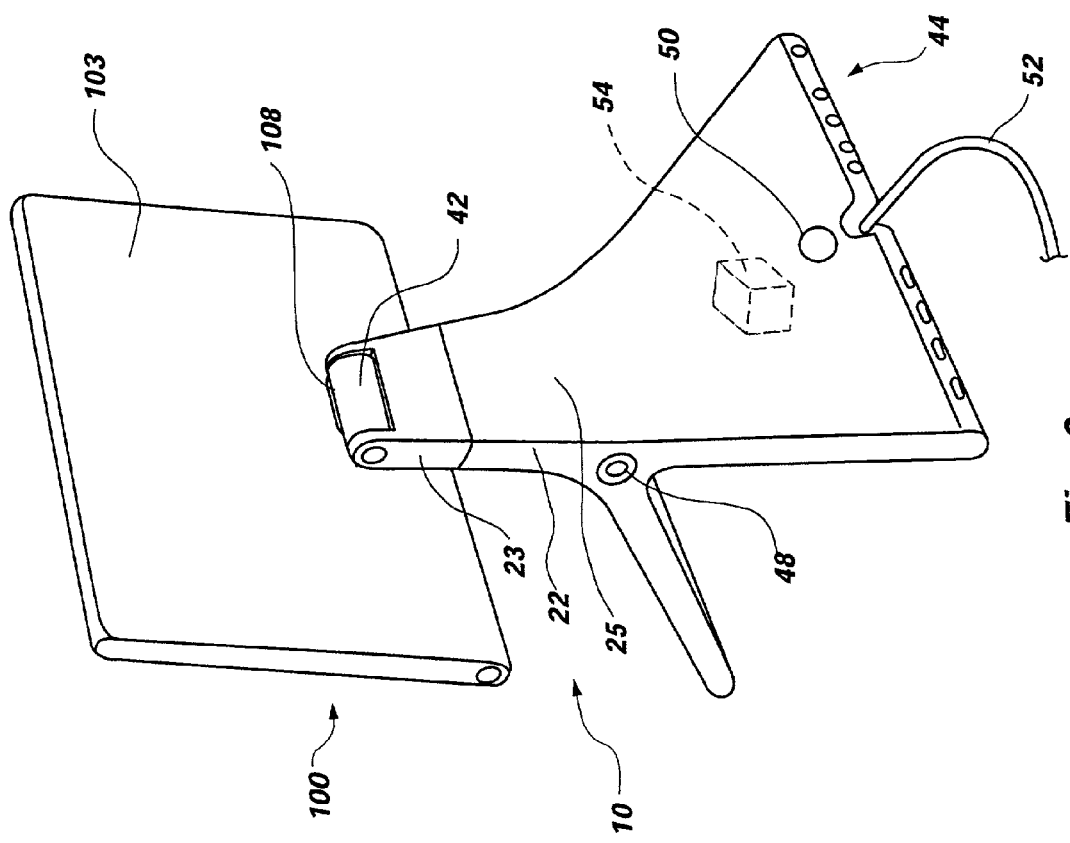

FIGS. 6a and 6b illustrate yet another embodiment of the present invention for use when the notebook is in a flat panel display configuration, as discussed above. The mounting member 42 is rotatably coupled to the upwardly extending pedestal 22. The notebook's input/output ports 108 are located on a bottom surface 103 of the notebook. This embodiment advantageously allows for a wide range of adjustment of the angle of the display screen. Also shown at 44 are possible connections for peripheral components (not shown). In all embodiments, the bottom surface 103 remains as the bottom surface of the notebook when the notebook is in either a flat panel display configuration or a conventional notebook configuration, thereby protecting the delicate keyboard and pointing device.

Also shown in FIG. 6a, the upwardly extending pedestal can advantageously include an upper section 23 and a lower section 25 to provide for elevational adjustment of the docking station. The upper and lower sections are locked in position relative to each other until the release mechanism 48 is depressed. Once released, the upper and lower sections can be adjusted upwardly or downwardly to increase or decrease the elevation of the laptop display screen. In this manner, the display screen elevation can be adjusted according to the preference of the user.

A power cord 52 is provided to supply power to the docking station. A spooling device 54 may be applied to spool the power cord inside the pedestal base upon activation by the user. By activating the retraction activation device 50 a user can retract all or some of the power cord into the spooling device to minimize the portion of power cord exposed.

Figure 7B:
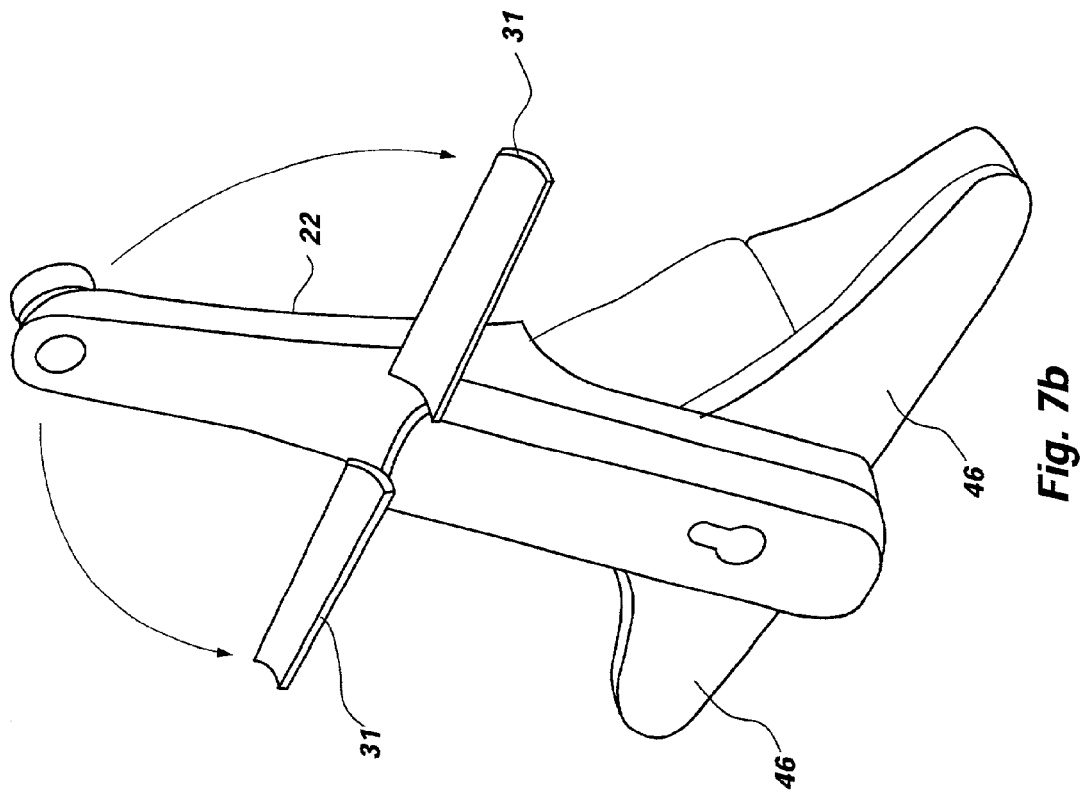
FIGS. 7a and 7b are elevated, perspective views of an alternate embodiment of the present invention.
Figure 7A:
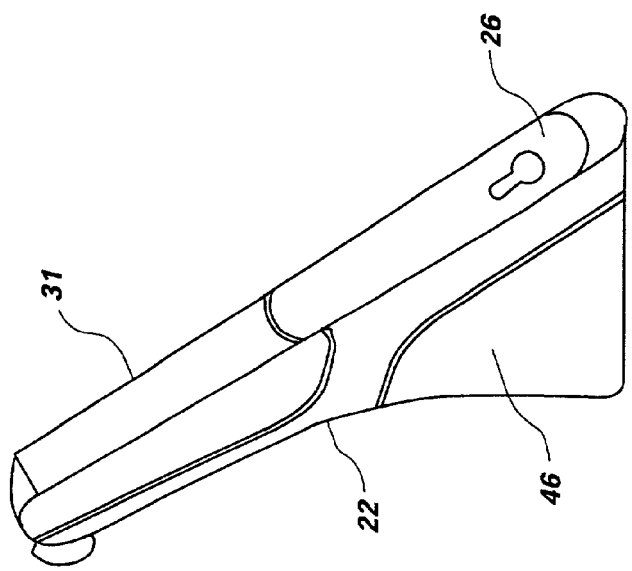

Another embodiment of the present invention is shown in FIGS. 7a and 7b. In this embodiment, the upper support members 31 are rotatably coupled to the upwardly extending pedestal 22. Lower folding support members 46 are coupled to the base section 26 of the pedestal. In this embodiment, the upper support members can be folded against the upwardly extending pedestal when the docking is not in use, conserving space and providing an aesthetically pleasing storage configuration. While in use, the upper support members can be locked into a substantially horizontal position to receive and support the notebook. Similarly, the lower folding support members can be folded against the pedestal when not in use. Locking the lower folding support members into an extended position against a work surface when using the docking station provides stable support base for the notebook. Both the upper and lower support members can be comprised of multiple members, as described above, or they can be formed of a single unit which rotates with respect to the pedestal.

Figure 8A:
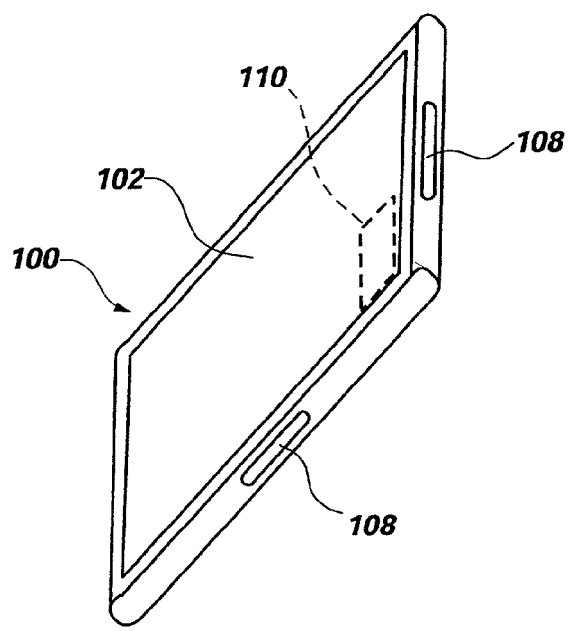
FIG. 8a is a perspective view of an alternate embodiment of a notebook computer for use with the present invention.
Figure 8B:
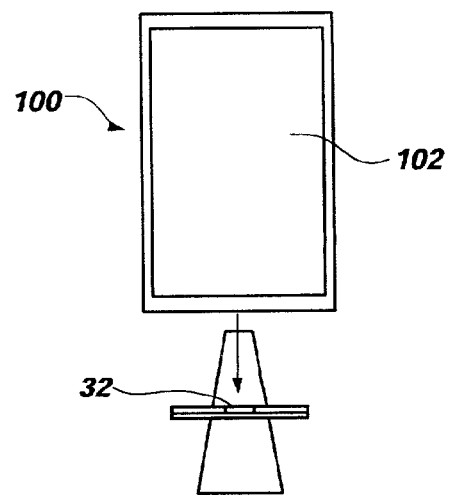
Figure 8C:
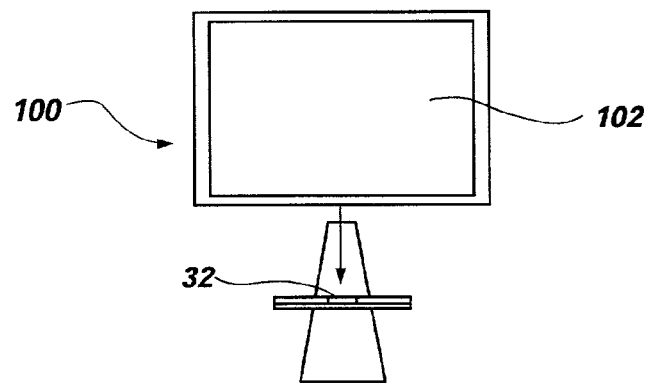

Yet another embodiment of the present invention is shown in FIGS. 8a through 8c. Traditional display units, desktop and notebook alike, generally have what is known in the art as a landscape orientation. That is, they have a width greater than a height. An embodiment of the present invention allows the notebook display to be used in either a landscape orientation or a portrait orientation. FIG. 8a shows a notebook computer 100 with input/output ports 108 located on two adjacent sides. As shown in FIGS. 8b and 8c, the notebook display can be docked to the port replicator components 32 in either orientation.

Orientation and display rotation circuitry 110 can be provided in the notebook to detect the orientation of the display based on which input/output ports are in use and to rotate images on the display to the correct viewer orientation. The viewer can thus advantageously select which viewing orientation is best in any particular situation. It is to be understood that the input/output ports 108 can be located on as few as one or as many as all of the sides of the notebook. Alternately, the input/output ports could be located on the bottom surface of the notebook as illustrated in FIGS. 6a and 6b, and the input/output ports can rotate to accommodate variable orientation of the notebook.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A pedestal docking station for use in converting a notebook computer into a desktop computer configuration which utilizes a display screen of the notebook computer, the pedestal docking station comprising:
    an upwardly extending pedestal, having an upper end, a base section, and an invariable center of mass contained within a surface of the upwardly extending pedestal;
    an upper mounting member coupled to the upper end of the upwardly extending pedestal, the mounting member being configured to receive the notebook computer in an elevated, supporting relationship at least four inches above a work surface with a center of mass of the notebook computer in substantial vertical alignment with the center of mass of the upwardly extending pedestal; and
    port replicator components coupled to the upper mounting member, the port replicator components corresponding to input/output ports of the notebook computer and including connections for attachment to supporting peripheral components.

2. A pedestal docking station as in claim 1, further comprising a securing device coupled to the upwardly extending pedestal, the securing device being configured to hold the notebook computer in a stable, substantially vertically inclined position.

3. A pedestal docking station as in claim 1, wherein the pedestal further comprises a notebook computer having a plurality of sides and includes:
    input/output ports located on at least one side of the notebook computer, the input/out ports being configured to be received by the port replicator components;
    orientation circuitry coupled to the input/output ports and configured to identify which of the input/output ports are being received by the port replicator components; and
    display rotation circuitry coupled to the input/output ports and configured to rotate visual images displayed on the display screen of the notebook computer;
    wherein the pedestal docking station is configured to support the notebook computer on any of the plurality of sides, the orientation circuitry is configured to identify which of the plurality of sides the notebook is supported on, and the display rotation circuitry is configured to display the visual images in a vertically-proper configuration, regardless of the actual orientation of the notebook computer.

4. A pedestal docking station as in claim 1, wherein the base section of the upwardly extending pedestal has a widest portion adjacent to the work surface to maximize an area of the work surface in direct physical support of the docking station.

5. A docking station as in claim 1, wherein the surface of the upwardly extending pedestal tapers from the base section to the upper end.

6. A docking station as in claim 1, wherein the upper mounting member comprises:
    a back support plate for supporting a surface opposite the display screen of the notebook computer;
    a bottom plate for supporting the computer along one side; and
    an upwardly projecting stopping flange positioned at a forward edge of the bottom plate, the stopping flange configured to engage an edge of the notebook computer along the display screen to further secure the notebook computer to the pedestal docking station.

* * * * *